Patented Oct. 15, 1929

1,731,488

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

THERMOPLASTIC COMPOSITION AND METHOD OF MAKING SAME

No Drawing.   Application filed December 28, 1926. Serial No. 157,623.

This invention relates to thermoplastic compositions and more particularly to rubber conversion products, and it has for an object to provide products of this character which shall be readily moldable at low temperatures into commercial articles and which shall at normal temperatures be free from tack or stickiness in handling. A further general object of this invention is to provide a practical method for producing compositions of the above described character.

It has heretofore been proposed to make heat-plastic conversion products of rubber by treating rubber at elevated temperatures with isomerizing agents for rubber, certain of such products and methods of making them being described in my Patent No. 1,605,180, granted November 2, 1926. Many of the hard, tough, friable rubber isomers have been found to have a slight surface tack when handled in warm weather and for this reason not to be well adapted for certain uses.

The purpose of the present invention is to modify these heat-plastic products in such a manner that they shall be free from surface tack and at the same time shall possess the characteristic property of being readily moldable at relatively low temperatures.

I have found that these heat-plastic rubber isomers when heated with as little as 15 per cent of sulfur become vulcanized, much in the same way as does rubber, to form a vulcanized rubber isomer. Vulcanization can be carried to a point where these vulcanized products are absolutely free of tack, but they are by this action made practically non-thermoplastic, that is, they possess a very high softening point. I have found that the heat plasticity may be resorted to these vulcanized products, and that they may be changed to have a relatively low softening point if they are melted and then solidified by cooling, and that these solidified products may be made to be as free from tack as the vulcanized product before melting and consequently may be employed as a base for the manufacture of a wide variety of moldable articles.

The vulcanized rubber isomer may be prepared in either of two ways: Either by preparing the rubber isomer and then incorporating therein sulfur and vulcanizing it, or initially incorporating the sulfur with the isomerizing agent in the rubber and combining the two reactions. The resulting products in either case have the same general appearance and when re-melted produce non-tacky readily thermoplastic materials having the same general characteristics.

Where the rubber isomer is first made, I prefer to mix into 100 parts by weight of rubber, as on a rubber mill, an admixture comprising 8 parts of p-toluene sulfonic acid, 2 parts of concentrated sulfuric acid (specific gravity 1.82) and 2 parts of water, the latter being added to facilitate the mixing, and when the acids have been thoroughly dispersed through the rubber, I heat the batch, as in a hot air oven maintained at 140° C., for eight hours. The resulting product is a hard, strong, thermoplastic material which breaks with a conchoidal fracture and which is readily moldable at relatively low temperatures.

Similar heat plastic isomeric conversion products of rubber may be prepared by employing in place of the admixed p-toluene sulfonic acid and sulfuric acid of the above example, other isomerizing agents of rubber, of which the following are given by way of example:

(a) organic sulfonyl chlorides, such as p-toluene sulfonyl chloride; or (b) organic sulfonic acids, such as p-toluene sulfonic acid; or (c) halides of amphoteric metals, such as ferric chloride.

In commercial operations it is desirable to homogenize the heat-plastic rubber isomer, either by working on a rubber mill or by comminuting, or in other suitable manner, and in any case the homogenizing step may be accompanied by washing with water to remove any residual soluble reagent. Where the washing step is omitted, sulfur may be added directly to the rubber isomer during the homogenizing step, as by adding it on the mill, or by adding it during the comminuting process. I preferably employ from 15 to 40 parts by weight of sulfur to 100 parts by weight of the thermoplastic, although I have found that as low as 15 per cent of sulfur will accomplish the purpose of the present application. The batch is now placed in a suitable heater and vulcanized under conditions comparable with those employed in the vulcanization of rubber, during which the sulfur combines with the rubber isomer to form a non-tacky vulcanized product which, however, is practically non-thermoplastic. This vulcanized product is now placed in a receptacle and heated, preferably by a suitable metal bath, to a temperature of approximately 300° C., at which temperature the vulcanized product melts and when cooled becomes non-tacky and readily thermoplastic.

Experience has shown that where the vulcanized product is subjected to heat at a temperature materially above that of its melting point, that upon cooling the product regains some of its tacky properties. It has been considered to be advisable for this reason to draw off the liquefied product as soon as it has been melted and allow it to cool. This is readily accomplished in a funnel heater surrounded by a metal bath, the funnel having suitable openings to permit the melted stock to be drained away. The melted vulcanized rubber isomer thus prepared may be made into molded articles which will be free of tack, or it may be admixed with compounding ingredients in a manner similar to that employed in the manufacture of molded articles from shellac, synthetic resins and the like.

Where the above described non-tacky thermoplastic product is pressed in molds made of nickel, as in the manufacture of phonograph records, it is found that the composition has in some instances a slight tendency to tarnish the nickel, due in all probability to the presence of hydrogen sulfide which is formed during the molding operation. The composition can be made non-staining by mixing into it before or after melting a small amount of a basic material, such as zinc oxide, which will combine with the hydrogen sulfide as formed and thus prevent its escape from the material being molded. This non-staining, non-tacky thermoplastic composition possesses in a high degree the desirable characteristics of a heat-moldable composition.

As has been hereinabove mentioned, I find it desirable for certain purposes, to include the sulfur with the isomerizing agent in the original reaction mixture. As an example of this method of procedure, I masticate 100 parts by weight of rubber, as on a rubber mill, and add thereto during mastication an admixture of 8 parts of p-toluene sulfonic acid and 2 parts of concentrated sulfuric acid (specific gravity 1.82), 2 parts of water being added to assist in the mixing operation, and I also add to the rubber during mastication and either before or after or concurrently with the incorporation of the above described acid mixture, 40 parts by weight of sulfur. When the ingredients have been thoroughly mixed, the batch is heated as in an air oven maintained at 149° C. for from four to six hours. The resulting product is a vulcanized rubber isomer and is a non-tacky and practically non-thermoplastic dark amorphous solid.

As in the previous example given, the admixture of p-toluene sulfonic acid and sulfuric acid may be replaced by other isomerizing agents of rubber. It should also be understood that while I have specified 40 parts of sulfur in the above recipe, lesser proportions of sulfur may be employed, as low as 15 parts of sulfur having been found to give satisfactory products for some purposes.

The vulcanized conversion product of rubber thus produced is heated as above described until it melts and then is permitted to cool, the liquefied portion being preferably permitted to be drawn away as melted. The solidified melted product has the non-tacky, readily thermoplastic properties described in connection with the previous example and non-staining properties may be imparted to it by the addition of a suitable base in the manner also described hereinabove.

It is evident that many modifications may be made in the above described process and that the thermoplastic product forming the subject matter of this application need not necessarily be produced entirely from crude rubber. As an illustration, 10 parts of rubber are masticated on a mill with 90 parts of inner tube scrap and 20 parts of p-toluene sulfonic acid and 30 parts of sulfur are added thereto during the mastication. The batch is heated in an oven maintained at 145° C. for four hours as in the above examples and the resulting product is then treated in any of the several ways hereinabove described. In general, it has been found that the melted and solidified vulcanized reaction products prepared from high grade scrap are somewhat stronger than those prepared from crude rubber, but their melting point is somewhat higher and they are consequently not as satisfactory for certain molding operations.

It is obvious that numerous modifications and variations may be made in the above described processes and that the isomeric rubber compositions and vulcanizates which are treated in the manner hereinabove described to render them non-tacky, non-staining, readily-thermoplastic products may be produced in any manner whatsoever without departing from the spirit of this invention.

I claim:

1. The method of producing a non-tacky, readily thermoplastic composition which comprises preparing a vulcanized isomeric conversion product of rubber, thereafter melting the said product, and then cooling it.

2. The method of producing a non-tacky, readily thermoplastic composition which comprises preparing a vulcanized isomeric conversion product of rubber, thereafter heating the resulting product to its melting temperature, and drawing off and cooling the liquefied portions as the melting progresses.

3. The method of producing a non-tacky, readily thermoplastic composition which comprises preparing a vulcanized isomeric conversion product of rubber, homogenizing the product, thereafter melting the said product, and then cooling it.

4. The method of producing a non-tacky, readily thermoplastic composition which comprises preparing a vulcanized isomeric conversion product of rubber, homogenizing the product and admixing therewith a basic substance, thereafter melting the said product, and then cooling it.

5. The method of producing a non-tacky, readily thermoplastic composition which comprises preparing a vulcanized isomeric conversion product of rubber, homogenizing the product and admixing therewith an oxide of a heavy metal, thereafter melting the said product and then cooling it.

6. The method of producing a non-tacky, readily thermoplastic composition which comprises preparing a vulcanized isomeric conversion product of rubber, homogenizing the product and admixing therewith zinc oxide, thereafter heating the resulting product to its melting temperature, and drawing off and cooling the liquefied portions as the melting progresses.

7. The method of producing a non-tacky, readily thermoplastic composition which comprises treating rubber at elevated temperatures with an isomerizing agent for rubber and with sulfur, melting the resultant product, and then cooling it.

8. The method of producing a non-tacky, readily thermoplastic composition which comprises treating rubber at elevated temperatures with an isomerizing agent for rubber and with sulfur, thereafter heating the resulting product to its melting temperature, and drawing off and cooling the liquefied portions as the melting progresses.

9. The method of producing a non-tacky, readily thermoplastic composition which comprises treating rubber at elevated temperatures with an isomerizing agent for rubber and with sulfur, homogenizing the product and admixing therewith a basic substance, melting the resultant product, and then cooling it.

10. The method of producing a non-tacky, readily thermoplastic composition which comprises treating rubber at elevated temperatures with an isomerizing agent for rubber and with sulfur, homogenizing the product and admixing therewith zinc oxide, thereafter heating the resulting product to its melting temperature, and drawing off and cooling the liquefied portions as the melting progresses.

11. The method of preparing a non-tacky, readily thermoplastic composition which comprises treating at elevated temperatures a sulfur containing rubber composition with a substance selected from a group comprising organic sulfonyl chlorides, organic sulfonic acids and sulfuric acid, thereafter melting the resulting product and then cooling the melted product.

12. The method of preparing a non-tacky, readily thermoplastic composition which comprises treating at elevated temperatures a rubber composition capable of being vulcanized to a hard rubber with an isomerizing agent for rubber, thereafter heating the resulting product to its melting point, and drawing off and cooling the liquefied portions as the melting progresses.

13. The method of preparing a non-tacky, readily thermoplastic composition which comprises treating at elevated temperatures a rubber composition capable of being vulcanized to a hard rubber with an isomerizing agent for rubber, thereafter melting the resulting product and then cooling the melted product.

14. The method of preparing a non-tacky, readily thermoplastic composition which comprises treating at elevated temperatures a rubber composition capable of being vulcanized to a hard rubber with an isomerizing agent for rubber, homogenizing the resulting product, melting the homogenized product and then cooling it.

15. The method of preparing a non-tacky, readily thermoplastic composition which comprises treating at elevated temperatures a rubber composition capable of being vulcanized to a hard rubber with an isomerizing agent for rubber, homogenizing the reaction product and incorporating therewith a basic substance, and thereafter melting the admixture and then cooling it.

16. The method of preparing a non-tacky, readily thermoplastic composition which comprises treating at elevated temperatures a rubber composition capable of being vulcanized to a hard rubber with a substance selected from a group comprising organic sulfonyl chlorides, organic sulfonic acids and sulfuric acid, comminuting the reaction product and admixing therewith an oxide of a heavy metal, and thereafter melting the admixture and then cooling it.

17. A non-tacky, readily thermoplastic, vulcanized isomeric conversion product of rubber.

18. A non-tacky, readily thermoplastic, vulcanized reaction product of rubber and an isomerizing agent for rubber.

19. A non-tacky, readily thermoplastic, vulcanized reaction product of rubber and a substance of the general formula R—SO$_2$—X.

20. A non-tacky, readily thermoplastic vulcanized reaction product of rubber and a sulfonic acid.

In witness whereof I have hereunto set my hand this 20th day of November, 1926.

HARRY L. FISHER.